Patented July 27, 1943

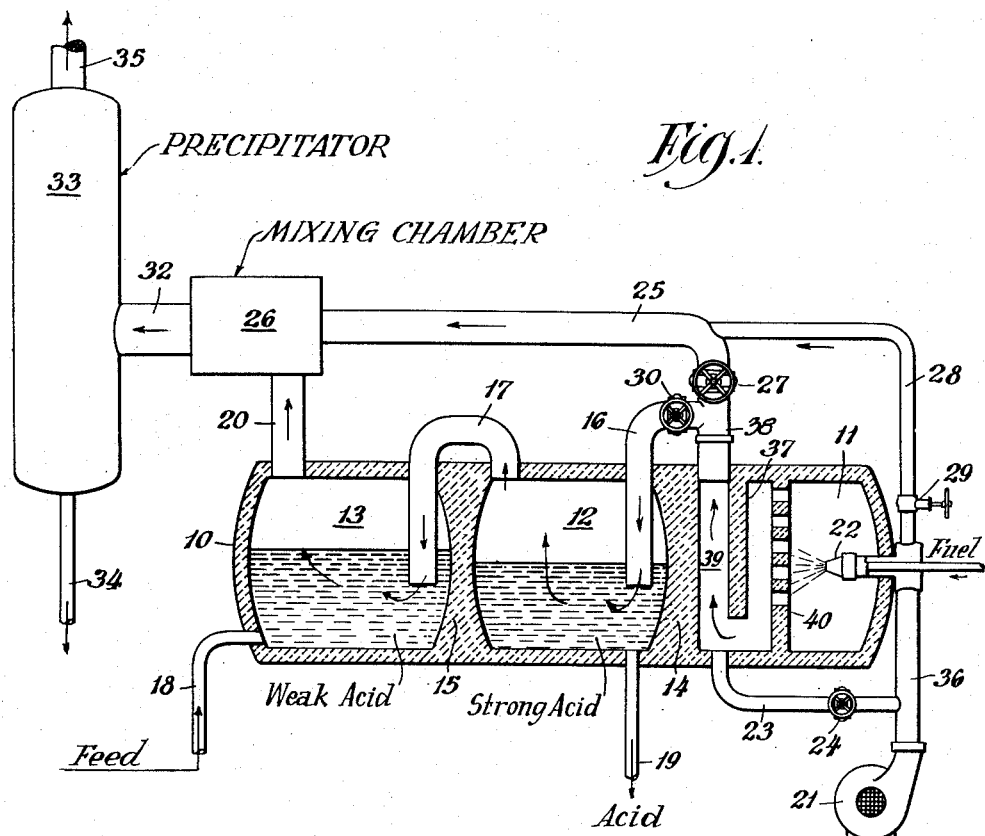

2,325,566

UNITED STATES PATENT OFFICE 2,325,566

SULPHURIC ACID CONCENTRATION

Edwin G. Wiley, Hammond, Ind., Leonard A. Groshans, Chicago, Ill., and Claude P. McNeil, Whiting, Ind., assignors to Standard Oil Company, Chicago, Ill., a corporation of Indiana Application February 19, 1940, Serial No. 319,620

6 Claims. (Cl. 23—307)

This invention relates to the concentration of sulphuric acid and relates more particularly to a method of treating sludge acids obtained in the refining of petroleum oils or their fractional distillates.

The concentration of acid in multiple-stage acid concentrators of the type described, for example, in Hechenbleikner, United States Patent 1,991,745, or the type described in Bachi United States Patent 2,155,633, is well known. Usually such multi-stage concentrators are used in conjunction with a mist tower or a precipitator for the collection of entrained sulphuric acid as well as sulphur dioxide and sulphur trioxide fumes carried over from the concentrator by the hot gases.

It is an object of this invention to provide a method for concentrating sulphuric acid in which the sulphuric acid fumes escaping from the system are reduced to a negligible amount. Another object of this invention is to provide an improved method for the elimination or reduction of "acid fog" from the precipitators of an acid concentrating system. It is a still further object of our invention to provide an improved method for reducing the visible fumes from an acid concentrating system in a simple and economical manner. Further objects and advantages will become apparent as the description of our invention proceeds.

In the drawing, which forms a part of this specification, Figure 1 is an elevation partly in section of a concentrator system embodying our invention. Figure 2 is a top plan view of the multi-stage acid concentrator shown in Figure 1.

Referring now to Figures 1 and 2, a horizontal cylindrical or drum-shaped steel tank 10 is provided with a furnace 11, a strong acid chamber 12 and weak acid chamber 13. Tank 10 is divided by walls 14 and 15, which divide tank 10 into chambers 12 and 13 and furnace 11. Conduits 16 and 17 provide inlets to the acid chambers 12 and 13 in series relation for hot gases from furnace 11. Feed acid enters through line 18 and concentrated acid can be withdrawn through line 19. Conduit 20 provides for the escape of gases from the multi-stage concentrator, and particularly from weak acid chamber 13. Air is supplied by blower 21. A part is directed to furnace 11 in which is located burner 22 and a part is by-passed directly to the combustion chamber of furnace 11 via line 23 having therein a valve 24 for control purposes. A portion of the hot gases from furnace 11 is directed through conduit 25 to mixing chamber 26, the amount being controlled by valve 27. A further portion of the air supplied by blower 21 may be directed to conduit 25 through line 28 controlled by a valve 29. A valve 30 in line 16 controls the amount of gas directed to strong acid chamber 12. The flow of acid from weak acid chamber 13 to strong acid chamber 12 may take place through conduit 31 which may be in the form of an air lift. Gases from mixing chamber 26 pass through conduit 32 to precipitator 33 wherein the greater part of the acid contents are removed through line 34. The remaining gases escape via line 35. Precipitator 33 may be of any well known type such as a Cottrell electrical precipitator or there may be substituted therefor a mist tower comprising a tower filled with packing such as Raschig rings, etc. through which acid may be circulated for the recovery of sulphuric acid fumes in the gas stream.

In carrying out the concentration of sulphuric acid and particularly sludge acid from the treating of petroleum stocks, the weak acid of an acidity of 30 to 60%, for example 40%, is fed through line 18 to weak acid stage 13 where the concentration is raised to, for example, 60% acidity by the hot combustion gases which enter from strong acid stage 12 through conduit 17. The stronger acid formed by evaporation of water from the acid in weak acid chamber 13 is continuously withdrawn through line 31 to strong acid stage 12 where the concentration is continued to say 80% acidity.

Hot combustion gases are furnished from furnace 11, air being supplied in controlled amounts from blower 21 through line 36 and attaining a temperature of approximately 1800° F. The hot combustion gases are then diluted in mixing chamber 39 back of wall 37 and checker wall 40 by cold air from conduit 23 until the gases escaping through conduit 38 from furnace 11 have a temperature of approximately 1200° F. Valve 24 and the fuel supply are so manipulated as to provide not only the desired amount of air but also the desired temperature. The major portion of the 1200° F. gas passes through conduit 16 which dips below the surface of the acid in strong acid chamber 12 thereby, both by heat and by the velocity of the gas, driving off water from the acid and increasing the acidity thereof. The gases exit at a temperature of approximately 400–450° F. and enter weak acid chamber 13 through conduit 17 which also dips below the surface of the acid layer. Alternatively, conduits 16 and 17 may terminate above the surface of the acid, thereby causing the heated gases to impinge on the surface of the liquid.

The moisture laden gases having entrained therein considerable quantities of $SO_2$, $SO_3$ and $H_2SO_4$ escape from weak acid stage 13 through conduit 20 at a temperature of approximately 200° F. Ordinarily these gases are directed immediately to a precipitator or a mist tower for the recovery of the acid contained therein. In a Cottrell precipitator, for instance, the gas passes upward through vertical passages which are grounded electrodes. The discharge electrodes consist of thin wire stretched along the vertical axis of the pipe and are supplied with a uni-directional current of 75,000 volts or more. The particles of acid mist acquire an electrical charge and are impelled toward the electrode of the opposite polarity and are thus deposited on the walls of the pipes, the liquid flowing down these walls into a collecting chamber and thence withdrawn through line 34. The gas now practically free from mist is discharged to the atmosphere through line 35. In a mist tower the acid mist flows upward against the surface of the packing. The acid particles are deposited thereon and flow downward to the base of the tower where they are withdrawn. Generally, it is advisable to assist condensation by the circulation of either water or, preferably, acid, through the tower.

Unfortunately, in the practical use of such equipment, the gases which are discharged overhead and theoretically are free of acid particles and any great quantity of sulphur dioxide or sulphur trioxide do, in fact, contain considerable amounts of these constituents so that the stack gases often appear in the form of a dense white cloud which, being heavier than air, drifts quickly to the ground. Because of the presence of the acidic materials the gas is extremely irritating to human beings and, therefore, although the concentration may be sufficiently low so that no physical harm will come thereof it does have a very decided nuisance value and is, accordingly, to be avoided as far as possible.

We have discovered that if the temperature of the exiting gases is increased from 200° F. to the range of 275–450° F. and preferably 295–325° F. that the concentration of acidic material in the exit gases from the precipitator or mist tower is very considerably decreased. For example, an exit gas having a temperature of about 200° F. showed between 90 and 110 mg. of sulphuric acid per cubic foot of air while after heating the exit gases to 300° F. the sulphuric acid content was reduced to 20–30 mg. per cubic foot. Moreover, the stack fumes, which were white and dense at the higher sulphuric acid concentration, became practically colorless and much lighter under the conditions employing "superheating."

In order to obtain this "superheating" of the exit gases a line 25 leading from conduit 38 and furnace 11 is directed to mixing chamber 26. Since the gases in this line have a temperature of about 1200° F. it is desirable to reduce this temperature somewhat. Cold air, therefore, is added through line 28, the amount thereof being controlled by valve 29 so that the temperature of the gases in conduit 25 is approximately 800° F. This gas then is thoroughly mixed with the exit gases from line 20 in mixing chamber 26 so that the temperature of the gases passing through line 32 to precipitator 33 is in the range of 275–450° F. and preferably about 295–325° F. The amount of hot gas necessary to increase the temperature of the exit gases from weak acid stage 13 will necessarily be dependent upon the volume of gas passing through the concentration system as well as on the temperature of the exit gases and will be regulated by valve 27 in line 25. It should be obvious that metering means may be used to indicate the relative volumes and thermo-couples installed to indicate proper temperature conditions.

The exact mechanism for this improvement in stack appearance and in the reduction of the amount of sulphuric acid present in the gases from the precipitator is not understood. It would ordinarily appear that by increasing the temperature, the velocity of the gases would be increased through the precipitator to such an extent that even greater quantities of acid would appear at the exit from the precipitator. In fact, this was shown to be the case when it was attempted to increase the temperature of the exit gases by directing hot gases directly into weak acid chamber 13. By injecting additional heated gases into the weak acid stage, it is possible to obtain increased concentration of the sludge acid, but the exit gases therefrom still persist in forming undesirable acid mists and fogs at the exit stack from the mist tower or precipitator. It is thought that the decreased acid content may be due to the effect of the heat of the gases in breaking down the air film around the mist particles, thereby permitting coalescence and the formation of droplets sufficiently large so that they will collect or be affected by the electrical charge.

This method of reducing sulphuric acid losses and the elimination or decrease of sulphuric acid fog in the exit gases from the concentration system may be accomplished in a most economical fashion. The additional equipment required is very little, comprising chiefly a by-pass line from the furnace together with cooling means therefor, and a mixing chamber or other means of contacting the hot furnace gases with the exit gases from the weak acid stage so that the temperature is raised uniformly to the desired range. The only other additional cost is the slightly increased fuel consumption necessary to supply the additional desired quantities of hot gases. This is to be contrasted with such proposed methods as burner stacks which may necessitate using an eductor system and quite possibly heating means to elevate the temperature to 1000° F. or higher; or a water wash system which entails the use of a very considerable gallonage as well as elaborate equipment to withstand the attacks of the acid used in scrubbing; or the installation of additional collecting systems such as additional precipitators or enlarged absorption systems.

Although we have described one preferred embodiment of our invention, it should be understood that this is by way of illustration and not by way of limitation. For example, the concentration may be carried out in three or more stages, rather than two stages, as illustrated and described. Other means for carrying out our method of reducing sulphuric acid mist will occur readily to one skilled in the art and we intend to be limited only insofar as is set forth in the appended claims.

We claim:

1. In the method of concentrating sulphuric acid comprising treating liquid sulphuric acid by direct contact with heated gases, separating said gases together with acidic material entrained therein from said sulphuric acids at a temperature of about 200° F., and recovering from said gases a major portion of said entrained material, the improvement comprising further heating said gases to a temperature above 275° F. after separation from said liquid sulphuric acid and before recovering said entrained material.

2. The method according to claim 1 in which said further heating of said gases is carried out by admixing therewith a sufficient quantity of gases of a temperature higher than that of said exiting gases to produce a composite gas mixture having a temperature above 275° F.

3. In the method of concentrating sulphuric acid comprising treating liquid sulphuric acid by direct contact with heated gases and recovering from said gases the major portion of entrained acidic material, the improvement comprising further heating said gases to a temperature within the approximate range of 275–450° F. after separating said gases from said liquid sulphuric acid at a temperature below that attained in said further heating but before recovering said entrained acidic material to reduce substantially the loss of said entrained material from said recovery step.

4. In the method of concentrating sulphuric acid comprising treating liquid sulphuric acid by direct contact with heated gases and recovering from said gases the major portion of entrained acidic material, the improvement comprising further heating said gases to a temperature within the approximate range of 295–325° F. after separating said gases from said liquid sulphuric acid at a temperature below that attained in said further heating but before recovering said entrained acidic material to reduce substantially the loss of said entrained material from said recovery step.

5. In the method of concentrating sulphuric acid comprising treating liquid sulphuric acid by direct contact with heated gases and recovering from said gases the major portion of entrained acidic material, the improvement comprising further heating said gases to approximately 300° F. after separating said gases from said liquid sulphuric acid at a temperature below that attained in said further heating but before recovering said entrained acidic material to reduce substantially the loss of said entrained material from said recovery step.

6. In the method of concentrating sulphuric acid comprising the steps of directly contacting liquid sulphuric acid with heated gases, withdrawing from the concentrating zone the moisture laden gases together with entrained acidic material, and recovering entrained acidic material from said withdrawn gases, the improvement of substantially reducing the normal loss of said entrained acidic material from said recovery step which comprises heating said withdrawn gases by commingling additional amounts of heated gases with the withdrawn gases in proportions sufficient to bring the combined gas stream to a temperature above that of the withdrawn gases alone and within the approximate range of between about 275° F. and about 450° F., and introducing said commingled gas stream into said recovery step at said temperature whereby a more efficient recovery of the entrained acidic material is effected.

EDWIN G. WILEY.
LEONARD A. GROSHANS.
CLAUDE P. McNEIL.